(12) United States Patent
Stefik et al.

(10) Patent No.: US 9,031,944 B2
(45) Date of Patent: May 12, 2015

(54) SYSTEM AND METHOD FOR PROVIDING MULTI-CORE AND MULTI-LEVEL TOPICAL ORGANIZATION IN SOCIAL INDEXES

(75) Inventors: Mark Jeffrey Stefik, Portola Valley, CA (US); Lance E. Good, Gaithersburg, MD (US); Sanjay Mittal, Fremont, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 514 days.

(21) Appl. No.: 12/771,816

(22) Filed: Apr. 30, 2010

(65) Prior Publication Data

US 2011/0270830 A1    Nov. 3, 2011

(51) Int. Cl.
    *G06F 17/30* (2006.01)
(52) U.S. Cl.
    CPC ................. *G06F 17/30707* (2013.01)
(58) Field of Classification Search
    CPC ........... G06F 17/30; G06F 17/3071; G06F 17/30321; G06F 17/30648; G06F 17/30707
    See application file for complete search history.

(56) References Cited

U.S. PATENT DOCUMENTS

| | | | |
|---|---|---|---|
| 5,257,939 A | 11/1993 | Robinson et al. | |
| 5,369,763 A | 11/1994 | Biles | |
| 5,530,852 A | 6/1996 | Meske et al. | |
| 5,671,342 A | 9/1997 | Millier et al. | |
| 5,680,511 A | 10/1997 | Baker et al. | |
| 5,724,567 A | 3/1998 | Rose et al. | |
| 5,784,608 A | 7/1998 | Meske et al. | |
| 5,907,677 A | 5/1999 | Glenn et al. | |
| 5,907,836 A | 5/1999 | Sumita et al. | |
| 5,953,732 A | 9/1999 | Meske et al. | |
| 6,021,403 A | 2/2000 | Horvitz et al. | |
| 6,052,657 A | 4/2000 | Yamron et al. | |
| 6,064,952 A | 5/2000 | Imanaka et al. | |
| 6,233,570 B1 | 5/2001 | Horvitz et al. | |
| 6,233,575 B1 | 5/2001 | Agrawal et al. | |

(Continued)

FOREIGN PATENT DOCUMENTS

| | | |
|---|---|---|
| EP | 1571579 | 9/2005 |
| EP | 2048605 A2 * | 4/2009 |

(Continued)

OTHER PUBLICATIONS

Stefik, Mark, "Social Indexing"; Apr. 5-10, 2008; CHI 2008, Sensemaking Workshop, pp. 1-9.*

(Continued)

*Primary Examiner* — Christyann Pulliam
*Assistant Examiner* — Mellissa M Ohba
(74) *Attorney, Agent, or Firm* — Patrick J. S. Inouye

(57) ABSTRACT

A computer-implemented method affords multi-core and multi-level topical organization in social indexes. A corpus of articles is accessed. Each article includes online textual materials. A finite state pattern for a topic filters the articles as candidate articles, which are potentially on-topic. Similarity-based representations are formed for on-topic and off-topic core meanings of the topic. An aggregate score for each of the candidate articles is determined using the similarity-based representations to indicate whether the candidate article is sufficiently on-topic. The candidate articles are presented ordered by their aggregate scores. In a further embodiment, a hierarchy of topics is used to guide the presentation of articles from subtopics, with considerations of fairness of subtopic coverage, elimination of similarity-duplicates in articles, and article freshness.

8 Claims, 12 Drawing Sheets

(56) References Cited

U.S. PATENT DOCUMENTS

| | | | |
|---|---|---|---|
| 6,240,378 B1 | 5/2001 | Imanaka et al. | |
| 6,247,002 B1 | 6/2001 | Steels | |
| 6,269,361 B1 | 7/2001 | Davis et al. | |
| 6,285,987 B1 | 9/2001 | Roth et al. | |
| 6,292,830 B1 | 9/2001 | Taylor et al. | |
| 6,397,211 B1 | 5/2002 | Cooper | |
| 6,598,045 B2 | 7/2003 | Light et al. | |
| 6,772,120 B1 | 8/2004 | Moreno et al. | |
| 6,804,688 B2 | 10/2004 | Kobayashi et al. | |
| 6,981,040 B1 | 12/2005 | Konig et al. | |
| 7,062,485 B1 | 6/2006 | Jin et al. | |
| 7,092,888 B1 | 8/2006 | McCarthy et al. | |
| 7,200,606 B2 | 4/2007 | Elkan | |
| 7,275,061 B1 | 9/2007 | Kon et al. | |
| 7,281,022 B2 | 10/2007 | Gruhl et al. | |
| 7,293,019 B2 | 11/2007 | Dumais et al. | |
| 7,320,000 B2 | 1/2008 | Chitrapura et al. | |
| 7,409,404 B2* | 8/2008 | Gates | 1/1 |
| 7,426,557 B2 | 9/2008 | Gruhl et al. | |
| 7,467,202 B2 | 12/2008 | Savchuk | |
| 7,496,567 B1 | 2/2009 | Steichen | |
| 7,548,917 B2 | 6/2009 | Nelson | |
| 7,567,959 B2 | 7/2009 | Patterson | |
| 7,600,017 B2 | 10/2009 | Holtzman et al. | |
| 7,685,224 B2 | 3/2010 | Nye | |
| 7,707,206 B2 | 4/2010 | Encina et al. | |
| 7,747,593 B2 | 6/2010 | Patterson et al. | |
| 7,809,723 B2 | 10/2010 | Liu et al. | |
| 7,890,485 B2 | 2/2011 | Malandain et al. | |
| 8,010,545 B2* | 8/2011 | Stefik et al. | 707/758 |
| 8,073,682 B2* | 12/2011 | Stefik | 704/9 |
| 8,165,985 B2* | 4/2012 | Stefik | 706/62 |
| 8,549,016 B2* | 10/2013 | Stefik et al. | 707/749 |
| 8,671,104 B2* | 3/2014 | Stefik et al. | 707/759 |
| 2002/0161838 A1 | 10/2002 | Pickover et al. | |
| 2004/0019601 A1* | 1/2004 | Gates | 707/102 |
| 2004/0059708 A1 | 3/2004 | Dean et al. | |
| 2004/0236725 A1* | 11/2004 | Amitay et al. | 707/3 |
| 2005/0097436 A1 | 5/2005 | Kawatani | |
| 2005/0226511 A1 | 10/2005 | Short | |
| 2005/0278293 A1 | 12/2005 | Imachi et al. | |
| 2006/0167930 A1 | 7/2006 | Witwer et al. | |
| 2007/0050356 A1 | 3/2007 | Amadio | |
| 2007/0156622 A1 | 7/2007 | Akkiraju et al. | |
| 2007/0214097 A1 | 9/2007 | Parsons et al. | |
| 2007/0239530 A1 | 10/2007 | Datar et al. | |
| 2007/0244690 A1 | 10/2007 | Peters | |
| 2007/0260508 A1 | 11/2007 | Barry et al. | |
| 2007/0260564 A1 | 11/2007 | Peters et al. | |
| 2007/0271086 A1 | 11/2007 | Peters et al. | |
| 2008/0040221 A1 | 2/2008 | Wiseman et al. | |
| 2008/0065600 A1 | 3/2008 | Batteram et al. | |
| 2008/0126319 A1 | 5/2008 | Bukai et al. | |
| 2008/0133482 A1 | 6/2008 | Anick et al. | |
| 2008/0140616 A1* | 6/2008 | Encina et al. | 707/3 |
| 2008/0201130 A1 | 8/2008 | Peters et al. | |
| 2008/0307326 A1 | 12/2008 | Gruhl et al. | |
| 2009/0099839 A1* | 4/2009 | Stefik | 704/9 |
| 2009/0100043 A1* | 4/2009 | Stefik et al. | 707/5 |
| 2009/0248662 A1* | 10/2009 | Murdock | 707/5 |
| 2009/0300046 A1* | 12/2009 | Abouyounes | 707/102 |
| 2010/0042589 A1 | 2/2010 | Smyros et al. | |
| 2010/0057716 A1* | 3/2010 | Stefik et al. | 707/5 |
| 2010/0058195 A1* | 3/2010 | Stefik et al. | 715/744 |
| 2010/0070485 A1 | 3/2010 | Parsons et al. | |
| 2010/0083131 A1 | 4/2010 | You | |
| 2010/0114561 A1 | 5/2010 | Yasin | |
| 2010/0125540 A1* | 5/2010 | Stefik et al. | 706/12 |
| 2010/0205541 A1* | 8/2010 | Rapaport et al. | 715/753 |
| 2010/0278428 A1 | 11/2010 | Terao | |
| 2011/0047213 A1 | 2/2011 | Manuel | |

FOREIGN PATENT DOCUMENTS

| | | | |
|---|---|---|---|
| EP | 2048606 A2 * | 4/2009 | |
| EP | 2048607 A2 * | 4/2009 | |
| WO | 2005073881 | 8/2005 | |
| WO | 2007047903 | 4/2007 | |

OTHER PUBLICATIONS

Yu et al, "PEBL: Positive Example Based Learning for Web Page Classification Using SVM," Proc. of ACM SIGKDD International Conference on Knowledge Discovery and Data Mining (2002).

Nakashima et al., "Information Filtering for the Newspaper," 1997 IEEE Pacific RIM Conference NCE on Victoria, BC, Canada (Aug. 20-22, 1997), vol. 1, pp. 142-145.

Yuan Xue et al., "An Effective News Recommendation in Social Media Based on Users' Preference," 2008 International Workshop on Education Technology and Training and 2008 International Workshop on Geoscience and Remote Sensing, IEEE, Piscataway, NJ, USA, pp. 627-631 (Dec. 21, 2008).

Bracewell et al., "Reading: A Self Sufficient Internet News System with Applications in Information and Knowledge Mining," Natural Language Processing and Knowledge Engineering, International Conference, IEEE, PI, pp. 190-196 (Aug. 1, 2007).

K. Lerman, "Social Information Processing in News Aggregation," IEEE Computer Society, vol. 11, No. 6, pp. 16-28 (Nov. 1, 2007).

G. Linden, "People Who Read This Article Also Read . . . " IEEE Spectrum, vol. 45, No. 3, pp. 46-60 (Mar. 1, 2008).

C. Holahan, "So Many Ads, So Few Clicks," BusinessWeek, p. 38 (Nov. 12, 2007).

Rocha L. M., "Adaptive Webs for Heterarchies With Diverse Communities of Users," Workshop From Intelligent Networks to the Global Brain: Evolutionary Technology, pp. 1-35 (Jul. 3, 2001).

Arasu et al., "Searching the Web," ACM, New York, NY, US, pp. 2-43 (Aug. 1, 2001).

Anonymous "TF-IDF," Wikipedia, the free encyclopedia (Jul. 23, 2007).

Akiko Aizawa, "An Information-Theoretic Perspective of TF-IDF Measures," Information Processing and Management, Elsevier Science Ltd., vol. 39, No. 1, pp. 45-65 (Jan. 1, 2003).

Goldberg et al., "Using Collaborative Filtering to Weave an Information Tapestry," Communication of the Association for Computing Machinery, ACM, New York, NY, US, vol. 35, No. 12, (Dec. 1, 1992), pp. 61-70, XP000334368, ISSN: 0001-0782.

Chi et al., "ScentIndex and ScentHighlights: Productive Reading Techniques for Conceptually Reorganizing Subject Indexes and Highlighting Passages," Information Visualization, (Jan. 11, 2007), XP055041669, ISSN: 1473-8716, pp. 32-47.

P. Lenssen, "How Google News Indexes," http://blogoscoped.com/archive/2006-07-28-n49.html, Retrieved Apr. 3, 2009.

A. Agarwal, "How Google News Works," htt://labnol.blogspot.com/2005/05/how-google-news-works.html, Retrieved Apr. 3, 2009.

M. Helft, "How a Series of Mistakes Hurt Shares of United," New York Times. http://www.nytimes.com/2008109/15/technology/15google.html?, Retrieved Apr. 3, 2009.

J. Preston, "Why Google News Works." http://eatsleeppublish.com/why-google-news-works/, Retrieved Apr. 3, 2009.

C. Anderson, "The Long Tail: Why the Future of Business is Selling Less of More," Hyperion Press, New York, 2006.

Rajashekar et al., "Combining Automatic and Manual Index Representations in Probabilistic Retrieval," Journal of the American Society for Information Science, 46 (4), pp. 272-283, 1995.

Haav et al., "A Survey of Concept-Based Information Retrieval Tools on the Web," http://greta.cs.ioc.ee/~helemai/HaavLubiADBIS2001.pdf, 2001.

Brin et al., "The Anatomy of a Large-Scale Hypertextual Web Search Engine," Paper presented at the Seventh International Conference on World Wide Web, Brisbane, Australia, Apr. 14-18, 1998.

Card et al., "Readings in Information Visualization: Using Vision to Think," Morgan Kaufmann Publishers, San Francisco, 1999.

Chi et al., "EBooks With Indexes that Reorganize Conceptually," Paper presented at Human Factors in Computing Systems Conference Vienna, Austria, Apr. 24-29, 2004.

(56) References Cited

OTHER PUBLICATIONS

G. W. Furnas, "Generalized Fisheye Views," Paper presented at the Conference on Human Factors in Computing Systems, Boston, Massachusetts, 1986.

G. Sacco, "Dynamic Taxonomies and Guided Searches," Journal of the American Society for Information Science and Technology, vol. 57, Issue 6, Apr. 2006.

Biebricher et al., "The Automatic Indexing System AIR/PHYS—From Research to Application," In Readings in Information Retrieval, Morgan Kaufmann Publishers, San Francisco, 1997.

Arampatzis et al., "An Evaluation of Linguistically-Motivated Indexing Schemes," Proceedings of the BCSIRSG, 2000.

Schutze H., "The Hypertext Concordance: A Better Back-of-the-Book Index," Proceedings of Workshop on Computational Technology, pp. 101-104, Montreal, Canada, 1998.

Imai et al., "Improved Topic Discrimination of Broadcast News Using a Model of Multiple Simultaneous Topics," 1997 IEEE International Conference on Acoustics, Speech, and Signal Processing (ICASSP'97), Apr. 1997, pp. 727-730, vol. 2.

Kusek et al., "The Future of Music: Manifesto for the Digital Music Revolution," Boston: Berklee Press, 2005.

P. Pirolli, "Information Foraging Theory: Adaptive Interaction with Information," Oxford: Oxford University Press, 2007.

H. Simon, "Designing Organizations for an Information-Rich World." In Communications and the Public Interest, ed. Martin Greenberger. 37-72. The Johns Hopkins Press, 1971.

R. D. Burt, "Structural Holes and Good Ideas," American Journal of Sociology, vol. 110, No. 2, pp. 349-399, 2003.

C. Mezei, "The Digg Algorithm—Unofficial FAQ," SeoPedia, www.secopedia.org/tips-tricks/social-media/the-digg-algorithm-unofficial-faq, Nov. 2, 2006, Retrieved Apr. 14, 2009.

N. Patel, "There's More to Digg Than Meets the Eye," Pronet Advertising, www.pronetadvertising.com/articles/theres-more-to-digg-than-meets-the-eye.html, Jan. 15, 2007, Retrieved Jan. 27, 2008.

J. Dowdell et al., "Digg's Kevin Rose on Recent Indiggnation: Fact vs. Fiction," Marketing Shift, www.marketingshift.com/2006/9/diggs-kevin-rose-recent-indiggnation.cfm, Sep. 7, 2006, Retrieved Jan. 27, 2008.

J. Dowdell, "Digg Algorithm for Scoring Stories," Marketing Shift, www.marketingshift.com/2006/9/diggs-algorithm-elements-confirmed.cfm, Sep. 8, 2006, Retrieved Jan. 27, 2008.

(Wikipedia) "Google News". http://en.wikipedia.org/wiki/Google News, Retrieved Apr. 3, 2009.

G. A. Miller, "The Magical Number Seven, Plus or Minus Two: Some Limits on Our Capacity for Processing Information," Psychological Review, vol. 63, pp. 81-97, 1956.

\* cited by examiner

100

| ⊚ MyKiffets for stefik - Kiffets - Mozilla Firefox | _ ▫ ☒ |

File Edit View History Bookmarks Tools Help

⟨⟩⟩ ⌃ C × ⌂ ▣ http://www.kiffets.com/index-USAtopic-5020    ☆ ·  ⊠· Google    ⌕

▫ Kiffets(Vanilla)  ▫ Searches  ▫ Email  ▫ Movies  ▫ Share  ▫ Movies  ▫ Music  ▫ Misc  ▫ Fiffets  ▫ Fiffets2

▣ MyKiffets for stefik - Kiffets ▸

USA▸  102a      101      102b           ⊠ Share this Index
! Help Me Get Started!    Health and Safety > Natural Disasters   Stories From: (24 hours) - 2 days - Week - Month - All My Overview                Earthquakes                                           Fires My Indexes                 Basil decision delayed for 10 Americans in Haiti      Cause of deadly Illonois fire is unclear
+Add an Index  ▪ Reader    [nse.cnn.com] Feb. 11, 2010    ✗ off topic           [feedproxy.google.com] Feb 13, 2010
                                                                                                                 ✗ off topic
⊔ USA (113)       ✗        Canada to build Haitian govenment base
⊔ China Today (2) ✗        [seattletimes.newsource.com] Feb. 11,2010             National Briefing | Midwest: Illonois: Searching
⊔ Washington (16) ✗                                    ✗ off topic               for Cause in Deadly Blaze
⊔ Daily Dish (21) ✗        Canada to builds Haiti govenment HQ                   [feeds.nytimes.com] Feb 13, 2010  ✗ off topic
⊔ The Economy (1) ✗        [news.bbc.co.uk] Feb. 11,2010  ✗ off topic
⊔ World News (64) ✗                                                              Other articles...
                           Food charity makes difference in Haiti
Search in this Index       [benningbanner.com] Feb. 11,2010  ✗ off topic

[      ] 🔍              Pipeline of help to Haiti com
                           community
                           [benningbanner.com] Feb. 11,2010  ✗ off topic
Topics
+Add a Topic               US AID Steers No-Bid Haiti Contract to
                           'Politically Connected' Firm of Bill Clinton
USA (113)                  Friend
 ⊞ Crimes and the Courts (10)  [feeds.foxnews.com] Feb. 11,2010  ✗ off topic
 ⊞ Economy and Trade (21)       102c                              102d
   ⊞ Accidents
   ⊞ Healthcare (3)         Storms                                                Volcano Eruptions
   ⊞ Natural Disasters (13)
   ⊞ Pollution (9)          Related Topics  Travel USA>Natural Disasters>Storms   Related Topics  Travel USA>Natural Disasters>Volcano
   ⊞ Transit Safety (3)                                                           Watch > Natural Disasters > Volcanoes
                            The nation's weather
                            [feeds.nytimes.com] Feb 13, 2010                      Fears of another quake become new Haiti ▴ Find: [    ]          ☐ Match case
Done

FIG. 9

SYSTEM AND METHOD FOR PROVIDING MULTI-CORE AND MULTI-LEVEL TOPICAL ORGANIZATION IN SOCIAL INDEXES

FIELD

This application relates in general to digital information organization and, in particular, to a system and method for providing multi-core and multi-level topical organization in social indexes.

BACKGROUND

The lack of meaningful topical indexing makes effective searching of open-ended information repositories, especially the Worldwide Web ("Web"), difficult. Topical indexing provides helpful context, which can be crucial to successful information discovery, as search results alone often lack much-needed topical signposts or other contextual clues. Moreover, the user may be unfamiliar with the subject matter being searched, or could be unaware of the full extent of the information available in the repository. And even when knowledgeable about the subject matter, a user may still be unable to properly describe the information desired, may stumble over problematic variations in terminology, vocabulary, or language, or may simply be unable to formulate a usable search query.

Topical indexing can help alleviate these difficulties. For instance, open-ended information repositories can be organized through evergreen topical indexes that use finite state patterns built through curator-guided social indexing, such as described in commonly-assigned U.S. patent application, entitled "System and Method for Performing Discovery of Digital Information in a Subject Area," Ser. No. 12/190,552, filed Aug. 12, 2008, pending, the disclosure of which is incorporated by reference. This form of social indexing applies supervised machine learning to bootstrap curator-selected training material into fine-grained topic models as expressed through discrete Boolean queries for each topic in the topical index. Once trained, the topical index can be used for index extrapolation to categorize incoming content into topics under pre-selected subject areas.

Fine-grained social indexing uses high-resolution topic models, such as discrete Boolean queries expressed as finite state patterns, that precisely describe when articles are "on topic." However, the same techniques that make such topic models "fine-grained," also render the models sensitive to non-responsive "noise" words and other distractions that can appear on Web pages as advertising, side-links, commentary, or other content that has been added, often after-the-fact to, and which take away from, the core article contained on the Web page. Further, recognizing articles that are good candidates for topic broadening can be problematic when using fine-grained topic models alone, which can occur when a fine-grained topic model is trained too narrowly and is unable to find articles that are near to, but not exactly on, the same topic as the fine-grained topic.

Coarse-grained topic models use weighted characteristic word term vectors to characterize the population of words characteristic for topics. Combining fine-grained social indexing with characteristic word topic models can introduce resilience to noise, while providing robustness against overtraining that can result in overly-narrow fine-grained topic models. For instance, for each topic, a fine-grained topic model can be combined with a coarse-grained topic model, such as described in commonly-assigned U.S. patent application, entitled "System and Method for Providing Robust Topic Identification in Social Indexes," Ser. No. 12/608,929, filed Oct. 29, 2009, pending, the disclosure of which is incorporated by reference. Characteristic words are selected from the articles in the repository, scored using term frequency-inverse document frequency (TF-IDF) weighting, and normalized to form coarse-grained topic models. A term vector is then created for each coarse-grained topic model that characterizes the populations of characteristic words found in training examples. In combination, the fine-grained and coarse-grained topic models allow a curator to readily identify pages containing unacceptable "noise" content, propose candidate articles for near-misses to broaden a topic using positive training examples, and propose candidate articles for negative training examples to narrow a topic using negative training examples.

Notwithstanding, fine-grained social indexing, when used either alone or with coarse-grained topic models, and other forms of topical indexing, generally assume that each topic has only one core single-layer meaning. Articles are classified as being either "on-topic" if sufficiently similar to a representation of a single core meaning, or are categorized as being "off-topic."

In contrast, some forms of topics have multiple and equally-applicable core meanings. Natural topics, for instance, are created through folksonomies or related collaborative approaches to tagging and categorizing content. Under these approaches, the set of acceptable core meanings assigned to a topic depends upon the perspective of the reader: what one reader considers "on-topic" could equally be considered "off-topic" by another reader. However, both readers are correct; each simply desires different core meanings for the same topic as a reflection of their interpretation of what is, or is not, considered to be "on topic." Typically, the curator for the index has overall responsibility for determining the meanings for the topics.

Similarly, each topic can have subtopics, which in turn can each have multiple core meanings. This layering of topics results in a richer hierarchy of index entries that resembles a fractal-like nesting of core meanings. Each layer of subtopics has the same complexity as preceding layers, but within the scope of a specific topic. Existing topic models can also be organized hierarchically, yet topical diversity and semantic density are lacking and similarity duplication of articles can still occur across seemingly unrelated branches of the hierarchy.

Consequently, natural topics have a polysemic nature when a topic has several core meanings that apply equally depending upon whether an article is on-topic or off-topic. As well, a natural topic can have hierarchically-related meanings that are contextually embedded in a recursive manner. Conventional fine-grained topic models can be adapted for natural topics, such as by defining distinct finite state patterns for each core meaning. However, this approach raises further difficulties. One problem is that the overall pattern, which combines or excludes multiple meanings, can become cumbersome, complex and thereby difficult to maintain. A second problem is that the articles themselves may cover multiple topics. This problem leads to a need for a nuanced and gradual approach to classifying articles to indicate whether an article is mainly on topic, or close to a topic, or mainly off-topic, or far from a topic. A third problem occurs when a topic has subtopics. Subtopics introduce a potential for overlap in the classification of articles to topics, and duplication in the presentation of articles. For example, in 2010, the news covered the conflict between Google, a U.S.-based online search provider, and the government of China. News articles falling under that conflict could be classified under multiple general news topics. From one perspective, the articles are about Internet censorship. From another perspective, the articles are about the economic futures of Google and its competitors in China. From yet another perspective, the articles are about cyber attacks. From still another perspective, the articles are about trade between the U.S. and China. Depending on the topics or subtopics being presented, showing the same article on the same page under multiple topics should be avoided, that is, "topic-similarity duplication" in article presentation ought to be reduced.

Therefore, a need remains for providing topical organization to a corpus that accommodates natural topics in both a horizontal co-equal core meaning and vertical hierarchical, yet non-duplicative and embedded meaning fashion.

SUMMARY

One embodiment provides a computer-implemented system and method for providing multi-core topic indexing in electronically-stored social indexes. A corpus of articles is accessed. Each article includes online textual materials. A finite state pattern for a topic that filters the articles as candidate articles, which are potentially on-topic is provided. Similarity-based representations for on-topic and off-topic core meanings of the topic are provided. An aggregate score for each of the candidate articles is determined using the similarity-based representations to indicate whether the candidate article is sufficiently on-topic. The candidate articles are presented ordered by their aggregate scores.

A further embodiment provides a computer-implemented system and method for providing multi-level topic indexing in electronically-stored social indexes. A corpus of articles is accessed. Each article includes online textual materials. A plurality of levels of topics organized in a hierarchy is defined, wherein each subsequent topic level in the hierarchy includes one or more subtopics. Initially, the articles under the current topic level are identified and ordered. The remaining articles under the subtopics are recursively identified and ordered under each subsequent topic level using criteria selected from the group that includes freshness of the article, balance of topical coverage of the articles across each of the subtopics, and elimination of similarity-duplicates of the articles under each of the subtopics. The articles are presented.

Still other embodiments of the present invention will become readily apparent to those skilled in the art from the following detailed description, wherein are described embodiments by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

BRIEF DESCRIPTION OF THE DRAWINGS

FIG. 9 is a diagram showing, by way of example, a screen shot of subtopics hierarchically nested under one of the topical entries in the topical index of FIG. 8.

DETAILED DESCRIPTION

Glossary

The following terms are used throughout and, unless indicated otherwise, have the following meanings:

Corpus: Articles, documents, Web pages, electronic books, or other digital information available as printed material in an open-ended repository.

Document: An individual article within a corpus. A document can also include a chapter or section of a book, or other subdivision of a larger work. A document may contain several cited pages on different topics.

Cited Page: A location within a document to which a citation in an index refers, such as a page number. A cited page can be a single page or a set of pages, for instance, where a subtopic is extended by virtue of a fine-grained topic model for indexing and the set of pages contains all of the pages that match the fine-grained topic model. A cited page can also be smaller than an entire page, such as a paragraph, which can be matched by a fine-grained topic model.

Subject Area: The set of topics and subtopics in a social index, including an evergreen index or its equivalent. Also referred to as a channel.

Topic: A single entry within a social index. A topic can have single or multiple core meanings, and single- or multi-level meanings.

Multi-core Topic: A topic having several distinct meanings. From the perspective of article classification in social indexing, some of the core meanings may be designated as "on-topic" and other core meanings may be designated as "off-topic" according to the purposes of the topic in the index.

Subtopic: A single entry hierarchically listed under a parent topic in a social index. A subtopic can have single or multiple core meanings, and single- or multi-level meanings in its own right independent from its parent topic.

Fine-grained topic model: Generally a finite-state pattern, similar to a discrete Boolean query. This topic model is created by training a finite state machine against positive and negative training examples selected by a curator.

Coarse-grained topic model: Generally a weighted characteristic word term vector used in deciding which topics correspond to a finite-state pattern. This topic model is also created from positive training examples selected by a curator, plus a baseline sample of articles on all topics in an index.

Evergreen Index: An evergreen index is a social index that continually remains current with the corpus.

Social Indexing System: An online information exchange employing a social index to provide status indicators and facilitate the passing of documents from one community of users to another.

Digital Information Sensemaking and Retrieval Environment

Figure 1:
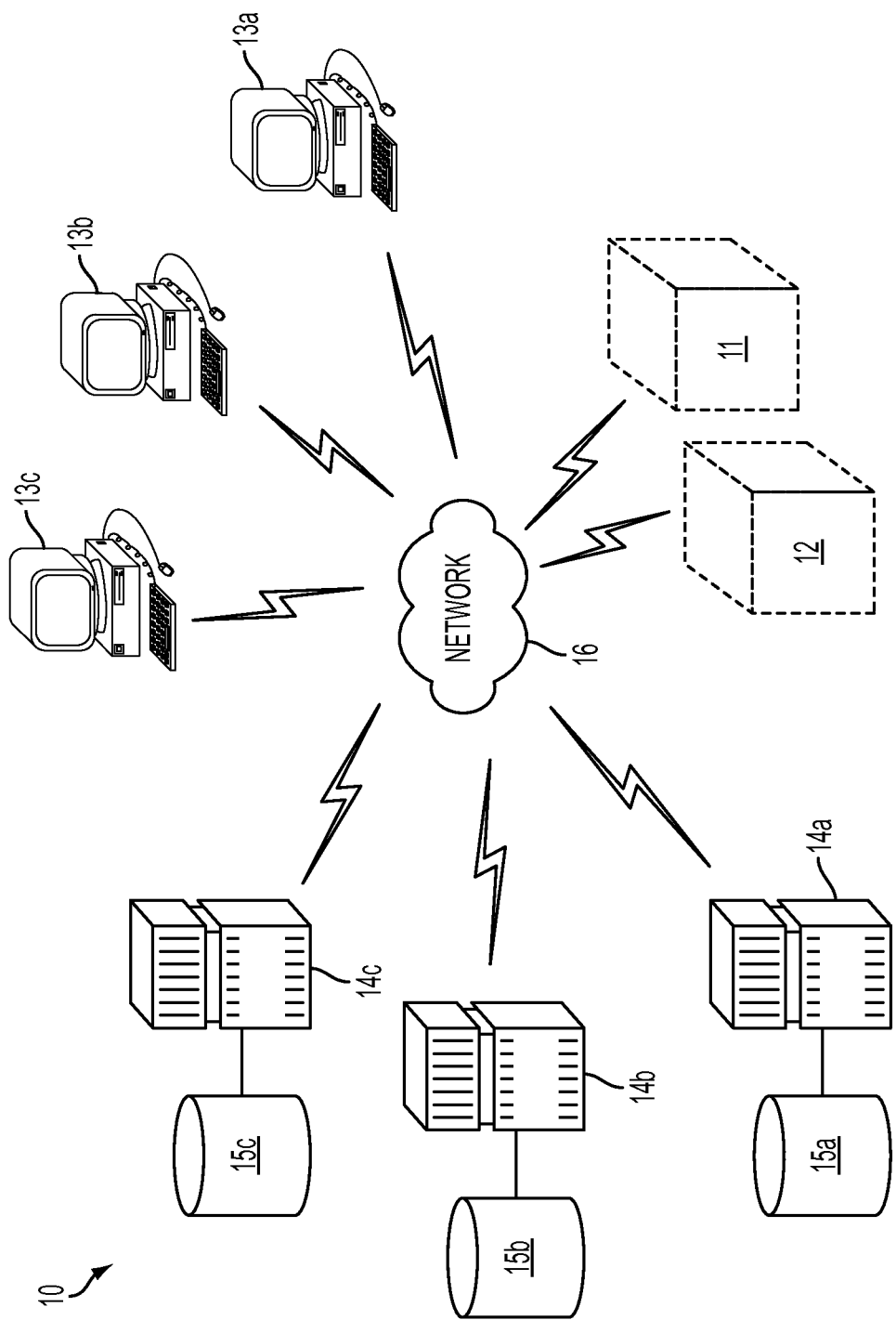
FIG. 1 is a block diagram showing an exemplary environment for digital information sensemaking.

Digital information sensemaking and retrieval are related, but separate activities. The former relates to sensemaking mediated by a digital information infrastructure, which includes public data networks, such as the Internet, standalone computer systems, and open-ended repositories of digital information. The latter relates to the searching and mining of information from a digital information infrastructure, which may be topically organized through social indexing, or by another indexing source. FIG. 1 is a block diagram showing an exemplary environment 10 for digital information sensemaking and information retrieval. A social indexing system 11 and a topical search system 12 work in tandem to respectively support sensemaking and retrieval, the labors of which can be used by information producers, such as bloggers, and information seekers through Web content, as well as widgets that execute on a Web browser.

In general, digital information is a corpus of information available in digital form. The extent of the information is considered open-ended, which implies that the corpus and its topical scope grow continually and without fixed bounds on either size or subject matter. A digital data communications network 16, such as the Internet, provides an infrastructure for provisioning, exchange, and consumption of the digital information. Other network infrastructures are also possible, for instance, a non-public corporate enterprise network. The network 16 provides interconnectivity to diverse and distributed information sources and consumers that respectively populate and access the corpus with articles and other content. Bloggers, authors, editors, collaborators, and outside contributors continually post blog entries, articles, Web pages, and the like to the network 16, which are maintained as a distributed data corpus through Web servers 14a, news aggregator servers 14b, news servers with voting 14c, and other information sources. These sources respectively serve Web content 15a, news content 15b, community-voted or "vetted" content 15c, and other information to users that access the network 16 through user devices 13a-c, such as personal computers, Web-enabled information appliances, smart phones, and the like, as well as other servers. For clarity, only user devices will be mentioned, although servers and other non-user device information consumers may similarly search, retrieve, and use the information maintained in the corpus.

In general, each user device 13a-c is a Web-enabled device that executes a Web browser or similar application, which supports interfacing to and information exchange and retrieval with the servers 14a-c. Both the user devices 13a-c and servers 14a-c include components conventionally found in general purpose programmable computing devices, such as a central processing unit, memory, input/output ports, network interfaces, and non-volatile storage. Other components are possible. As well, other information sources in lieu of or in addition to the servers 14a-c, and other information consumers, in lieu of or in addition to user devices 13a-c, are possible.

Principal Components

Figure 2:
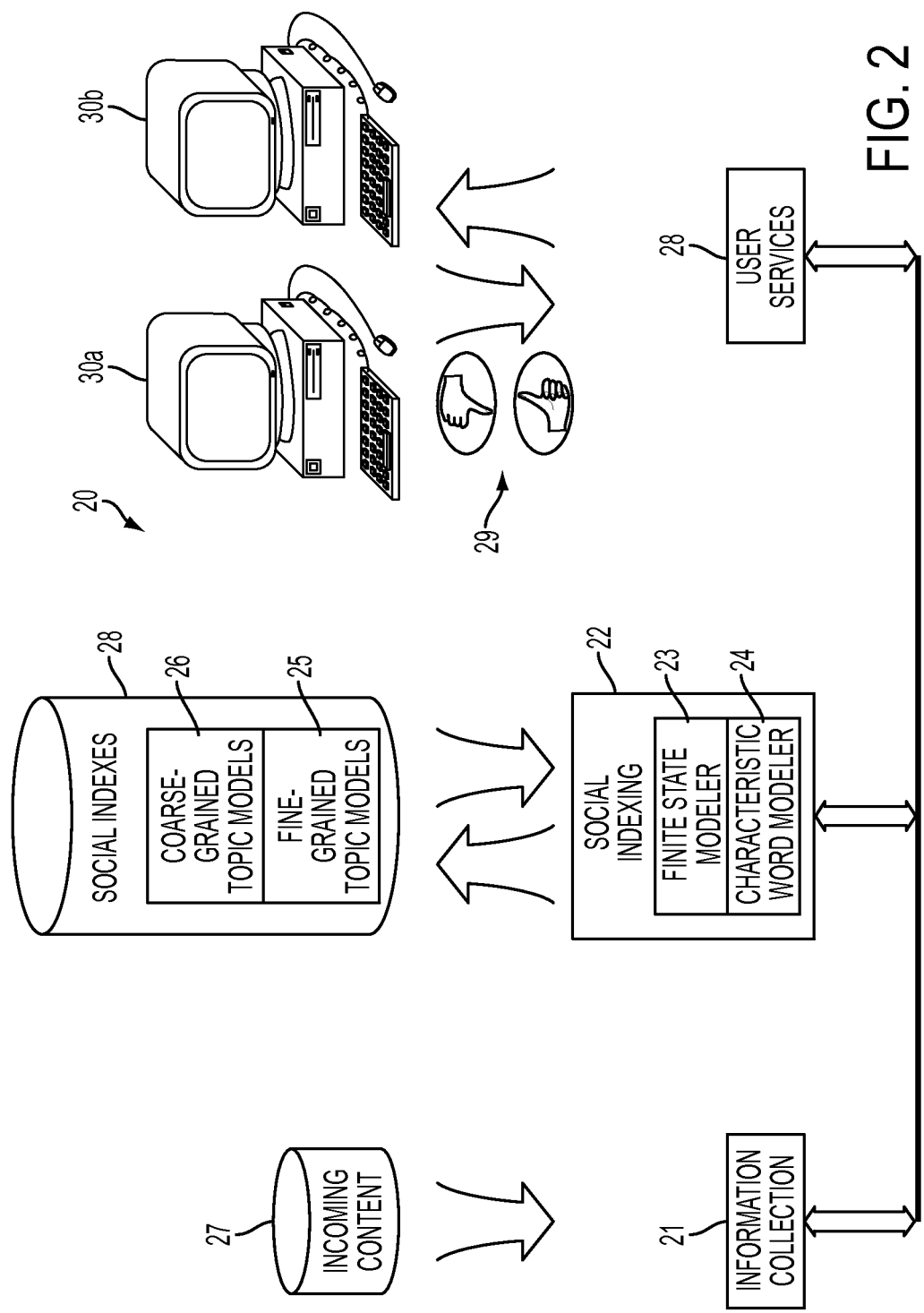
FIG. 2 is a functional block diagram showing principal components used in the environment of FIG. 1.

From a user's point of view, the environment 10 for digital information retrieval appears as a single information portal, but is actually a set of separate but integrated services that are accessed through a Web browser. FIG. 2 is a functional block diagram showing principal components 20 used in the environment 10 of FIG. 1. The components are focused on digital information categorization and organization. Additional components may be required to provide other related digital information activities, such as discovery, prospecting, and orienting.

The components 20 are implemented through three functional modules: information collection 21, social indexing 22, and user services 28. Other functional modules could be included for other features. Additionally, the functional modules can be implemented on the same or separate computational platform. Information collection 21 obtains incoming content 27, from the open-ended information sources or repositories, which collectively form a distributed corpus of electronically-stored information. The incoming content 27 is collected by a media collector (not shown) to harvest new digital information from the corpus. The incoming content 27 can typically be stored in a structured information repository, or indirectly stored by saving hyperlinks or citations to the incoming content in lieu of maintaining actual copies.

The incoming content 27 is collected as new digital information based on a collection schedule or as required. The incoming content 27 can be stored in a structured repository or database (not shown), or indirectly stored by saving hyperlinks or citations to the incoming content 27 in lieu of maintaining actual copies. Additionally, the incoming content 27 can include multiple representations, which differ from the representations in which the digital information was originally stored. Different representations could be used to facilitate displaying titles, presenting article summaries, keeping track of topical classifications, and deriving and using fine-grained topic models, such as described in commonly-assigned U.S. patent application Ser. No. 12/190,552, Id., or coarse-grained topic models, such as described in commonly-assigned U.S. patent application, entitled "System and Method for Providing a Topic-Directed Search," Ser. No. 12/354,681, filed Jan. 15, 2009, pending, the disclosure of which is incorporated by reference. Words in the articles could also be stemmed and saved in tokenized form, minus punctuation, capitalization, and so forth. The fine-grained topic models created by the social indexing system 11 represent fairly abstract versions of the incoming content 27, where many of the words are discarded and word frequencies are mainly kept.

The incoming content 27 is preferably organized through social indexing under at least one topical or "evergreen" social index, which may be part of a larger set of distributed social indexes 28 that covers all or most of the information in the corpus. In one embodiment, each social index 28 is built through a finite state modeler 23 in the social indexing system 22 and contains fine-grained topic models 25, such as finite state patterns, which can be used to test whether new incoming content 27 falls under one or more of the index's topics. The social indexing system applies supervised machine learning to bootstrap training material selected by a curator into fine-grained topic models for each topic and subtopic, as further described below beginning with reference to FIG. 3. Once trained, the evergreen index can be used for index extrapolation to categorize new information under the topics for pre-selected subject areas.

The fine-grained topic models 25 are complimented by coarse-grained topic models 26, also known as characteristic word topic models, that are generated by a characteristic word modeler 24 in the social indexing system 22 for each topic in the topical index. The coarse-grained topic models 26 are used to provide an estimate for the topic distance of an article from a core meaning of a topic, as further described below beginning with reference to FIG. 4.

Finally, user services 28 provide a front-end to users 30a-b to access the social indexes 28 and incoming content 27. In a still further embodiment, each social index 28 is tied to a community of users, known as an "augmented" community, which has an ongoing interest in a core subject area. The augmented community "vets" information cited by voting 29 within the topic to which the information has been assigned.

Topic Modeling

In the context of social indexes, topic models are computational models that characterize topics. Topic identification can be made more resilient and robust by combining fine-grained topic models with coarse-grained topic models. Additionally, topic breadth and richness can be expanded by permitting topics to have multiple core meanings and hierarchically nested meanings.

Fine-Grained Topic Models

Figure 3:
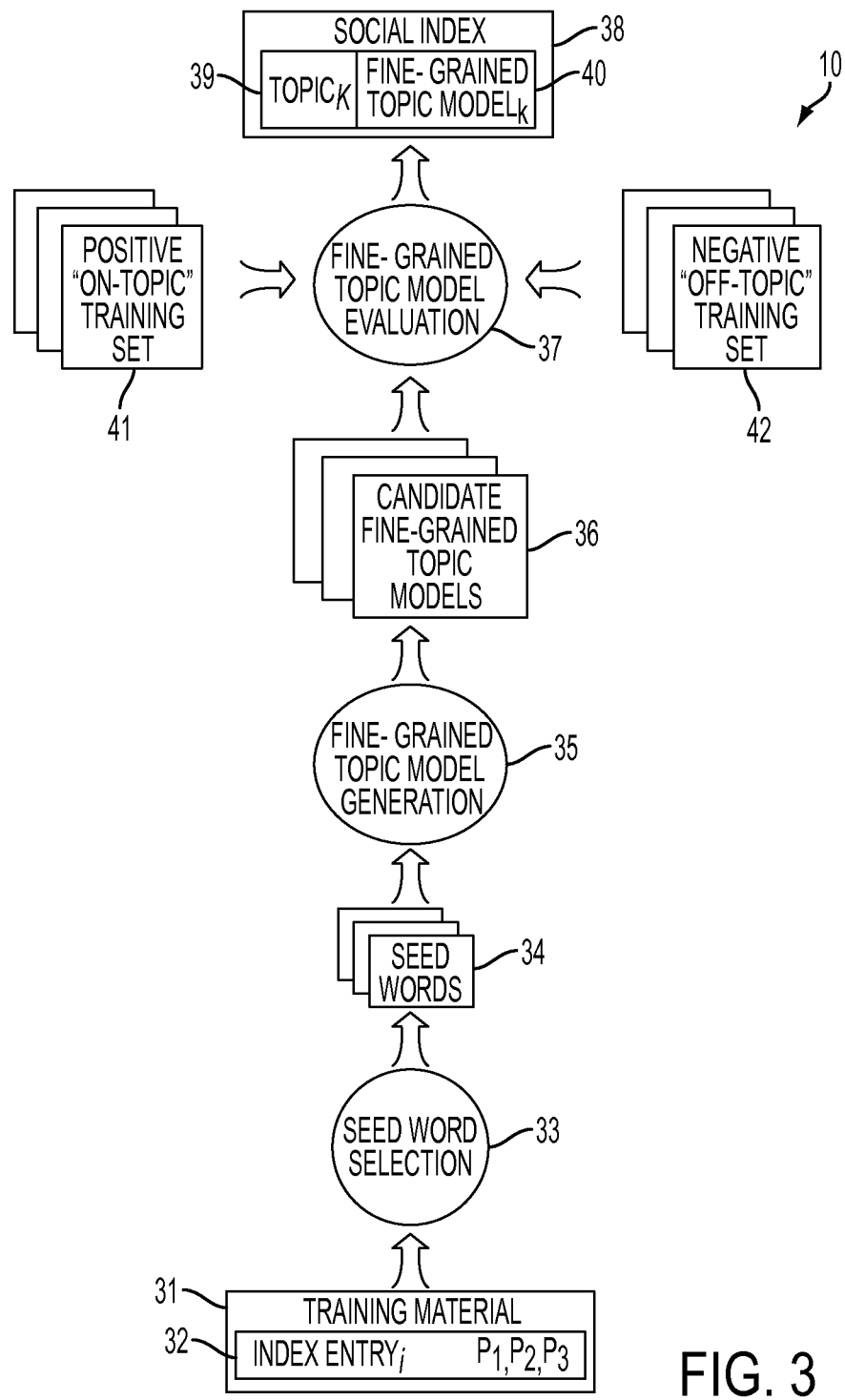
FIG. 3 is a data flow diagram showing fine-grained topic model generation in accordance with one embodiment.

Fine-grained topic models are created through supervised machine learning and can be used to extrapolate a social index into a form of "evergreen" index. FIG. 3 is a data flow diagram showing fine-grained topic model generation 30 in accordance with one embodiment. Fine-grained topic model generation is performed as a series of process or method steps executed by, for instance, a general purpose programmed computer, such as a server operating alone or in collaboration with other servers or devices as shown in FIG. 1.

In brief, a social index 38 is formed by pairing a topic or subtopic 39 with a fine-grained topic model 40, which is a form of finite state topic model. The social index 38 can be trained by starting with a training index 31, which can be either a conventional index, such as from a book, hyperlinks to Web pages, or an existing social index. Other sources of training indexes are available.

In detail, for each index entry 32, seed words 34 are selected (operation 33) from the set of topics and subtopics in the training index 31. Candidate fine-grained topic models 36 patterns, are generated (operation 35) from the seed words 34. Fine-grained topic models can be specified as patterns, term vectors, or other form of testable expression. The fine-grained topic models transform direct page citations or other topic references into an expression that can be used to test whether a text received as incoming content 27 is on topic, or not.

The candidate fine-grained topic models 36 are evaluated (operation 37) against sets of on-topic (positive) and off-topic (negative) training examples 41, 42, which have been selected by a curator. The positive and negative training examples 41, 42 are also used in identifying articles that are respectively "on-topic" and "off-topic" for multi-core topics, as further described below beginning with reference to FIG. 5. Initially, only positive training examples 41 are available, but negative training examples 42 later become available as training results provide feedback to the curator on accuracy of the candidate fine-grained topic model 36. Considerations of structural complexity are also helpful to avoid over-fitting in machine learning, especially when the training data are sparse.

Coarse-Grained Topic Models

Coarse-grained, or characteristic word, topic models 26 are statistically-based word population profiles that are represented as arrays or vectors of characteristic words and their corresponding weights, although other data structures could be used. A characteristic word model can contain hundreds or even thousands of words and their associated weights. Characteristic words are useful in discriminating text about a topic without making false positive matches, where a fine-grained topic model matches noise content on a page, or false negative matches, where a fine-grained topic model does not match a page.

Figure 4:
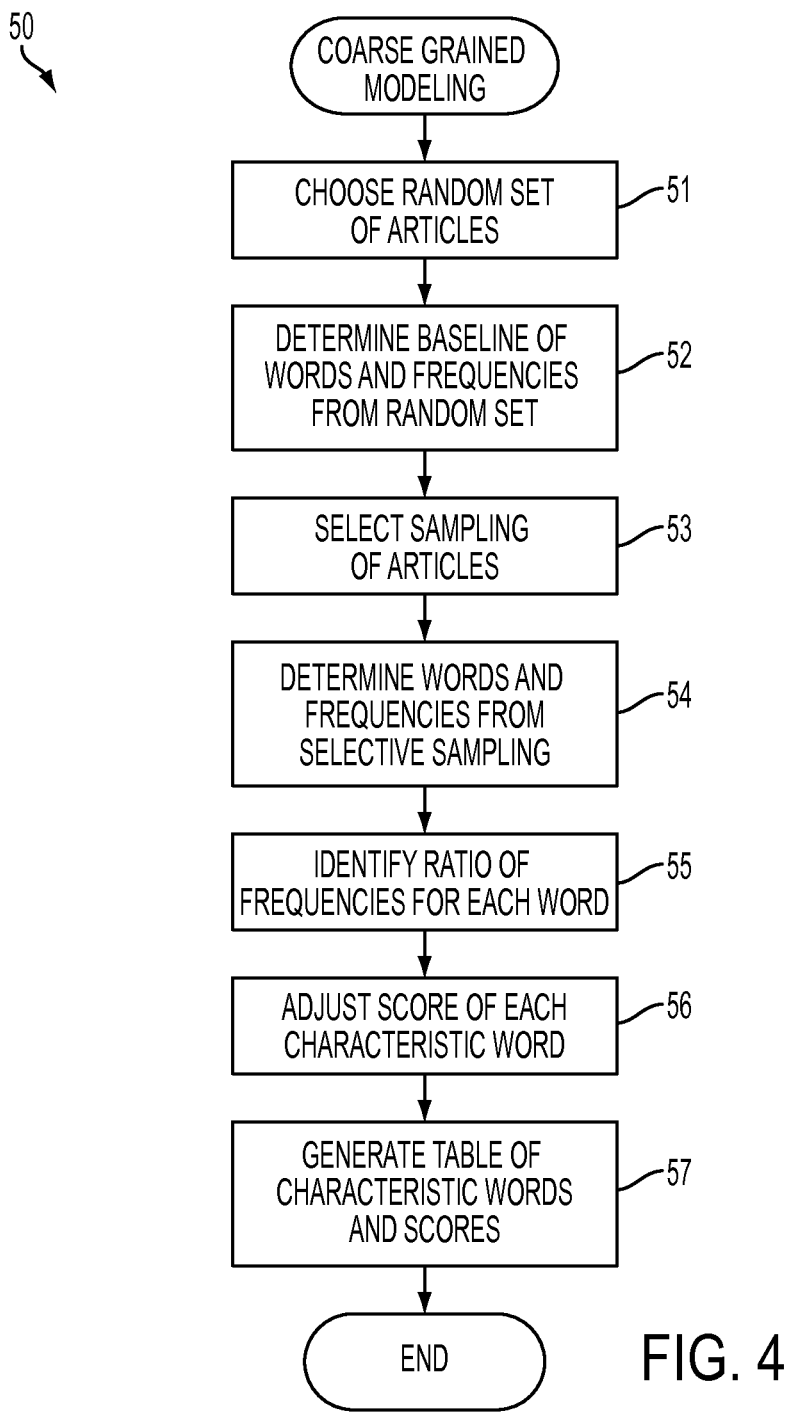
FIG. 4 is a data flow diagram showing coarse-grained topic model generation in accordance with one embodiment.

In social indexing, the weights typically assigned to each characteristic word are frequency ratios, for instance, ratios of TF-IDF weightings, that have been numerically boosted or deemphasized in various ways. FIG. 4 is a data flow diagram showing coarse-grained topic model generation 50 in accordance with one embodiment. Coarse-grained topic model generation is performed as a series of process or method steps executed by, for instance, a general purpose programmed computer, such as a server operating alone or in collaboration with other servers or devices as shown in FIG. 1.

Each coarse-grained topic model contains characteristic words and a score that reflects the relative importance of each characteristic word. Initially, a set of articles is randomly selected out of the corpus (step 51). A baseline of characteristic words is extracted from the random set of articles and the frequency of occurrence of each characteristic word in the baseline is determined (step 52). To reduce latency, the frequencies of occurrence of each characteristic word in the baseline can be pre-computed. In one embodiment, the number of articles appearing under the topics in an index is monitored, such as on an hourly basis. Periodically, when the number of articles has changed by a predetermined amount, such as ten percent, the frequencies of occurrence are re-determined.

In the case of a single-core topic, a selective sampling of the articles is selected out of the corpus, which are generally a set of positive training examples (step 53). In the case of multi-core topics, the training examples refer to potentially different cores. In one embodiment, the positive training examples are the same set of articles selected by a curator and used during supervised learning to build fine-grained topic models, described supra. In a further embodiment, a sampling of the articles that match the fine-grained topic models is used instead of the positive training examples. Characteristic words are extracted from the selective sampling of articles and the frequency of occurrence of each characteristic word in the selective sampling is determined (step 54). A measure or score is assigned to each characteristic word using, for instance, TF-IDF weighting, which identifies the ratio of frequency of occurrence of each characteristic word in the selective sampling of articles to the frequency of occurrence of each characteristic word in the baseline (step 55). The score of each characteristic word can be adjusted (step 56) to enhance, that is, boost, or to discount, that is, deemphasize, the importance of the characteristic word to the topic. Finally, a table of the characteristic words and their scores is generated (step 57) for use in the query processing stage. The table can be a sorted or hashed listing of the characteristic words and their scores. Other types of tables are possible.

Combining coarse-grained and fine-grained topic models gives better results than using either model alone. A fine-grained topic model is by itself a overly sensitive to noise words and susceptible to choosing off-topic content due to misleading noise. Since a coarse-grained topic model takes into account the full set of words in each article in its entirety, the model is inherently less sensitive to noise, even when the noise represents a small fraction of the words. In contrast, a coarse-grained topic model is by itself a blunt instrument. When topics are near each other, a fine-grained topic model can correctly distinguish those articles that are on-topic from those articles that are off-topic. However, both models assume that only a single core and non-layered meaning applies to each topic, whereas some forms of topical expression, such as natural topics, can have both multiple core meanings and hierarchically-nested meanings applying to a single topic.

Single-Core Topic Models

The term "single-core topic models" refers to topic models that have only one core meaning assigned per topic at a single level. Single-core topic models can be explicit or implicit. In explicit single-core topic models, articles are classified under a topic using a finite state pattern, such as a discrete Boolean query, and a similarity measure to topic center, for instance, by using a cosine function. A similarity measure is like a distance metric in that articles that are not similar enough are seen as being too far from the topic's single core meaning. A curator expressly identifies on-topic articles that are used to determine a single core meaning for the topic, as typified by an "average article."

Take, for example, articles matching the Boolean query, "gas prices." Articles focusing on the rise and fall of gas prices are closest in terms of similarity measure to the core meaning of the topic, while articles about off-shore oil drilling, rising costs of living in distant suburbs and commuting costs, and drilling for oil in the arctic are farther away in terms of similarity measure from the core meaning and somewhat off-topic. A single-core topic model, though, lumps all of these articles under the "gas prices" topic without further delineating differences in article topical focus.

The "average article" can also be determined in other ways. For instance, an "average article" could also be determined based on randomly-chosen articles matching the finite state pattern for the topic, such as described in commonly-assigned U.S. patent application, entitled "System and Method for Providing Default Hierarchical Training for Social Indexing," Ser. No. 12/360,825, filed May 4, 2009, pending, which can also be used to create coarse-grained topic models for default-trained topics that lack on-topic training examples, the disclosure of which is incorporated by reference. Alternatively, the "average article" could be determined based on a set of on-topic training examples provided by the curator, such as described in commonly-assigned U.S. patent application Ser. No. 12/608,929, Id. As well, the "average article" could be determined from a combination of randomly-chosen articles matching the finite state pattern for the topic and curator-provided on-topic articles, from a set of random articles matching a revised finite state pattern that expressly excludes articles that match curator-provided off-topic examples, or by a combination of the two foregoing approaches, that is from a set of random articles that excludes articles that match curator-provided off-topic articles. The resulting set of random articles could then be augmented with on-topic articles.

Single-core topic models recognize that topics with a scattering of articles occurring close to an "on-topic" center or falling slightly "off-topic" can still have a single core meaning, which is expressly defined based on curator-selected on-topic training examples. Implicit single-core topic models can still remove outlier articles, but do not require the curator to select on-topic training examples. Implicit single-core topic models are created by taking a suitable sample of articles that match a finite state pattern and determining an average article to implicitly define a central core meaning for the topic. The sampling of articles can be random, time-biased, for instance, favoring more recent articles over older articles, or based on other criterion. Similarity measures for articles identified through the finite state pattern are then ascertained in respect of the implicitly-defined core meaning of the topic.

Under both forms of single-core topic models, articles can be presented based on their similarity measure. In one approach, articles are sorted by their similarity measure, so that the articles near the center of the topic appear first, but all of the articles matching the finite state pattern are shown somewhere in the list. In another approach, articles below a minimum threshold score are pruned out and not presented.

Multi-Core Topic Models

Figure 5:
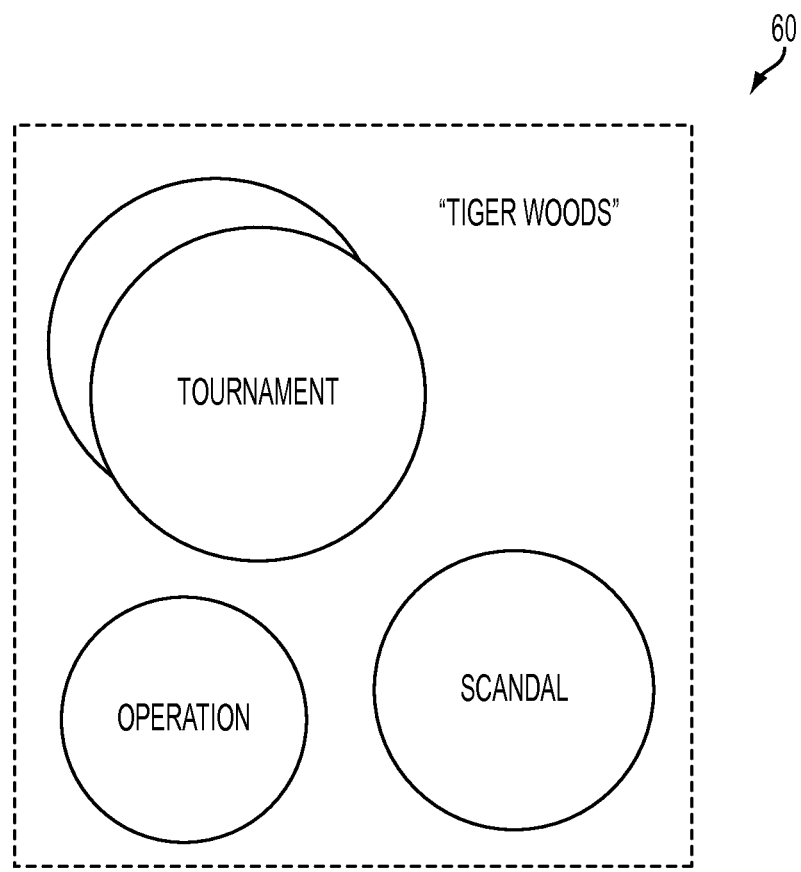
FIG. 5 is a diagram showing, by way of example, a topic with multiple core meanings.

Single-core topic models are insufficient to model natural topics and other forms of multi-dimensional topics. The term "multi-core topic models" refers to topic models that have more than one core of meaning assigned per topic at a single level. Multi-core topic models permit a single topic to possess multiple core meanings. FIG. 5 is a diagram 60 showing, by way of example, a topic 61 with multiple core meanings 62-64 in accordance with one embodiment. Assume a reader is interested in articles about professional golfer Tiger Woods. Under the general sports category of golfing, Tiger Woods has dominated the news over the last several years. In the basic sense, articles concerning him can be grouped under the general topic "Tiger Woods" 61, but such a simplistic approach fails to adequately filter out less apropos articles about the game of golf in general, which invariably make passing mention of Tiger Woods as the sport's dominant player extraordinaire.

Notwithstanding, during 2008 and 2009, articles about Tiger Woods shifted from covering his recovery from surgery on his left knee, to discussions about his winning play in golf tournaments, and finally to sensationalized reporting about aspects of his personal life and marriage. These points of discussion all concern Tiger Woods the golfer, yet are about divergent areas of Tiger Woods the topic. All are correct and are governed by the same finite state pattern used in finding articles under the topic "Tiger Woods," yet, depending upon the perspective of the reader, may either be considered "on-topic" or off-topic." These discussion points therefore represent narrower core meanings 62, 63, 64 that apply equally to the topic of Tiger Woods 61. Their distinct topic core meanings are defined by using training articles, such as the positive and negative training examples 41, 42 used in building fine-grained topic models 40 (shown in FIG. 3) and an equivalence metric, such as a cosine function that quantifies similarity to topic center for a core meaning.

This combined approach to defining the core meanings for a topic is generally more effective than just providing more elaborate finite state patterns. For example, even articles on the scandal surrounding Tiger Woods' alleged infidelity tend to mention his time away from tournaments and competition. A finite state pattern like ("Tiger Woods" AND "Tournament") would not filter out articles about the scandal. Instead, using examples of articles on the scandal that have been labeled as being "off-topic," examples of articles on his play in tournaments and competition that have been labeled as being "on-topic," and equivalence metrics based on these example articles would focus topical coverage without loss of generality due to overly specific finite state pattern specification.

Pre-Calculations for Multi-Core Topics

Figure 6:
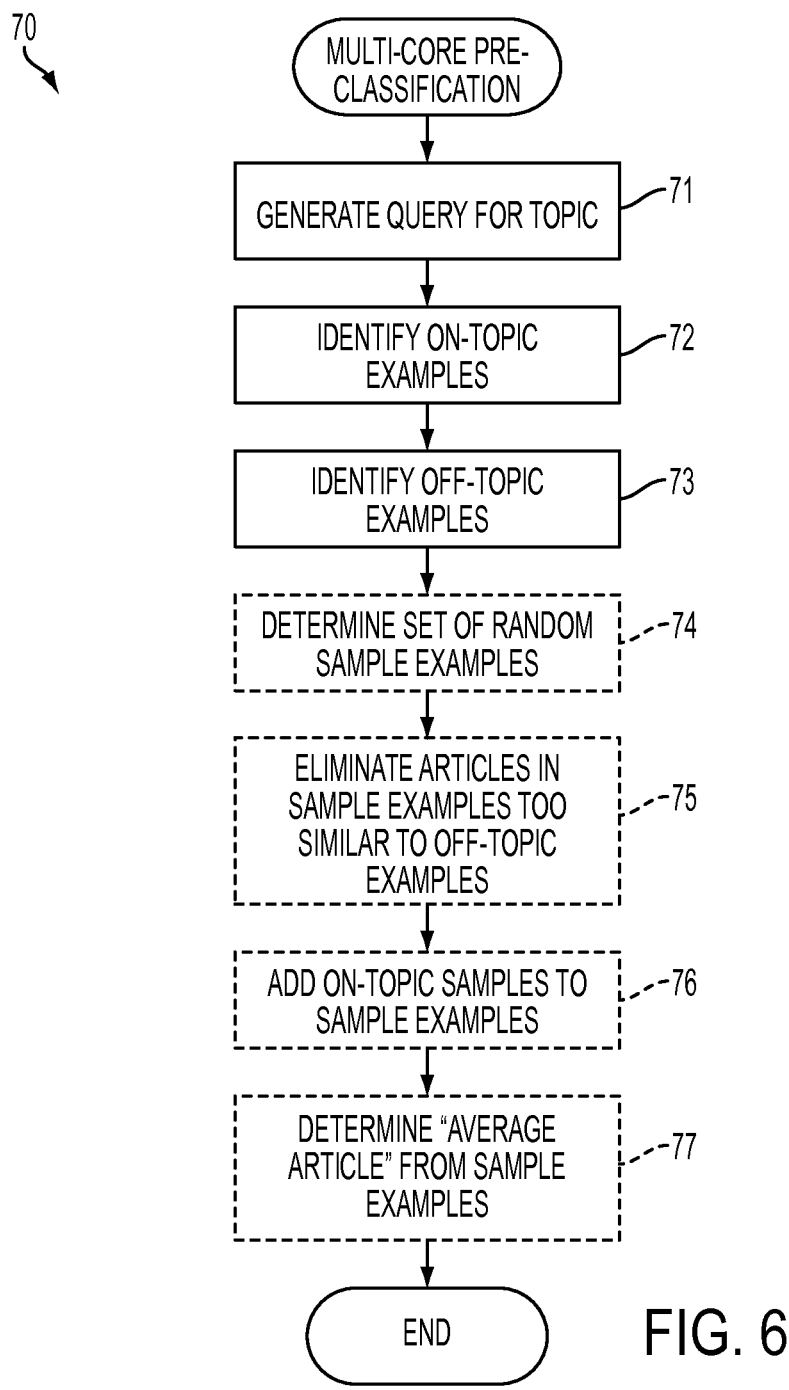
FIG. 6 is a flow diagram showing a method for performing operations prior to classification of multi-core topics in accordance with one embodiment.

Each core meaning corresponds to either a single on-topic article, or a single off-topic article, although the on-topic and off-topic articles can be combined in various ways to create blended and more complex core meanings. Multiple-core meanings are assigned to a topic prior to classification under a fine-grained topic models, described supra. FIG. 6 is a flow diagram showing a method 70 for performing operations prior to classification of multi-core topics in accordance with one embodiment. The pre-classification operations are performed as a series of process or method steps executed by, for instance, a general purpose programmed computer, such as a server operating alone or in collaboration with other servers or devices as shown in FIG. 1.

Prior to classification of articles under a topic model, a finite state topic model, such as a discrete Boolean query, is provided for each topic (step 71). The finite state topic model can be generated by the system, such as described in commonly-assigned U.S. patent application Ser. No. 12/190,552, Id., which employs example-based pattern generation, and U.S. patent application Ser. No. 12/360,825, Id., which employs example-free pattern generation, or suggest a finite state topic model to the curator as generated using one of the foregoing approaches upon request. Alternatively, the curator can specify a discrete Boolean query as the finite state topic model.

Following query generation, examples of articles that are on-topic and off-topic are identified (steps 72 and 73, respectively), generally by the curator. Initially, only on-topic articles are selected while the finite state patterns are evaluated, but off-topic articles are subsequently selected as the finite state patterns mature. An on-topic article is supplied for each explicit core meaning to be included and an off-topic article is supplied for each explicit core meaning to be specifically excluded. In one embodiment, the on-topic and off-topic examples respectively correspond to the positive and negative training examples 41, 42 used in building fine-grained topic models 40 (shown in FIG. 3), although the on-topic and off-topic examples could be specified separately. In a further embodiment, weighting factors could be used to bias the influence of the various on-topic and off-topic examples. Those on-topic or off-topic examples carrying more weight more strongly influence the respective similarity measures of articles under the on-topic and off-topic examples, while those on-topic or off-topic examples carrying less weight are proportionately less influential.

In one embodiment, a set of random sample examples is optionally formed and applied to determine an "average" on-topic article, which creates an additional core meaning that is representative of an "average" on-topic core meaning. The average article enhances robustness. A set of articles that match the finite state pattern is then selected for the topic by the system (step 74). The articles are used in modeling an "average" on-topic article. In one embodiment, the set includes up to 25 recent articles that match the finite state pattern for the topic, although other selection criteria may be used. Any article in the set that is too similar to a specified off-topic example is eliminated (step 75). Conversely, any on-topic examples are added to the set (step 76). Finally, an aggregate model of an "average article" is determined (step 77). In a further embodiment, creation and use of the "average" on-topic article can be omitted. Finally, each of the pre-classification operations (steps 71-77) are again performed as applicable for each remaining topic.

Variations

To summarize, the "average article" topic core meanings can be defined in several ways, such as:
(1) from a set of random sample examples of articles matching a finite state pattern, which combines a single-core topic model calculation with a multi-core topic model calculation, so that an article could be included if near an average article or an on-topic core, but not too near an off-topic core;
(2) from time-bias selection of articles matching a finite state pattern;
(3) based on explicitly-provided on-topic or off-topic articles;
(4) based on a combination of random and explicitly-provided on-topic articles;
(5) by one of the three foregoing approaches, but which have articles matching an off-topic core meaning, as defined by an off-topic example, removed;
(6) from off-topic cores defined by off-topic examples; and
(7) on-topic cores defined by on-topic examples.

In a further embodiment, the express determination of an "average article" could be eliminated and instead the influence of the "average article" could be increased or reduced by weighting.

Multi-Core Topic Classification

Figure 7:
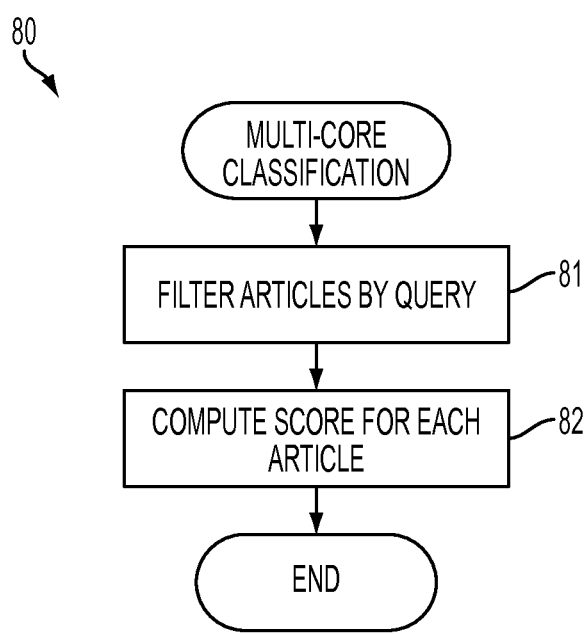
FIG. 7 is a flow diagram showing a method for performing operations during classification of multi-core topics in accordance with one embodiment.

Generally, a multi-core topic model has one optimal finite state pattern, such as a discrete Boolean query, and distinct similarity measures for each of the multiple core meanings belonging to the topic. The finite state pattern is determined prior to classification and the similarity measures are evaluated during classification. FIG. 7 is a flow diagram showing a method for performing operations during classification of multi-core topics in accordance with one embodiment. The classification operations are performed as a series of process or method steps executed by, for instance, a general purpose programmed computer, such as a server operating alone or in collaboration with other servers or devices as shown in FIG. 1.

Articles retrieved from the repository are categorized by the finite state patterns into discrete topics. As a result, each article is filtered by a particular query (step 81). A score for similarity measure is determined for each article (step 82). Scoring is calculated by finding the maximum on-topic score across the on-topic examples and the maximum off-topic score. An aggregate score is then computed. In one variation, an average article is treated analogously to an on-topic training example. In one embodiment, a cosine function is used as the similarity metric. In a further embodiment, the score equals the maximum similarity measure score for the article as compared with all of the on-topic examples and the "average article," minus the maximum similarity measure score for the article as compared with all of the off-topic examples. Other similarity measure score formulations could be used. Each of the classification operations (steps 81-82) are again performed for each remaining topic.

Following classification, the articles are presented to the reader, such as in the context of a topical index, ordered by their aggregate scores. In a further embodiment, articles may be presented without filtering through the finite state topic model by using the aggregate score to determine the order of presentation. As well, only those articles with an aggregate score meeting a minimum threshold may be presented.

Variations

The multi-core topic models can also incorporate the use of implicit sampling, such as used with single-core topic models, described supra. In one approach, explicit core topic models defined by on-topic training examples are combined with an average-article core defined by an implicit sample of articles. Alternatively, explicit core topic models defined by off-topic training examples are combined with an average-article core defined by an implicit sample of articles, which may be more intuitive (and less work) for a curator to define. Finally, the foregoing implicit and explicit approaches can be combined where the curator employs an average article, on-topic examples, and off-topic examples. The selection of articles for such a combination of core meanings combines their influences in selecting articles.

Multi-Level Topic Models

The term "multi-level topic model" or "fractal topic model" refers to topic models that are defined in terms of multiple levels. In multi-level topic models, high-level topics have subtopics and derive their meaning from a combination of their subtopics. The term "fractal" is suggestive of the recursive nature of the combination, where topics at each level are defined by their subtopics, which may also be multi-core or multi-level. However, the dimension of levels in a hierarchy is independent of the notion of core meanings.

Figure 8:
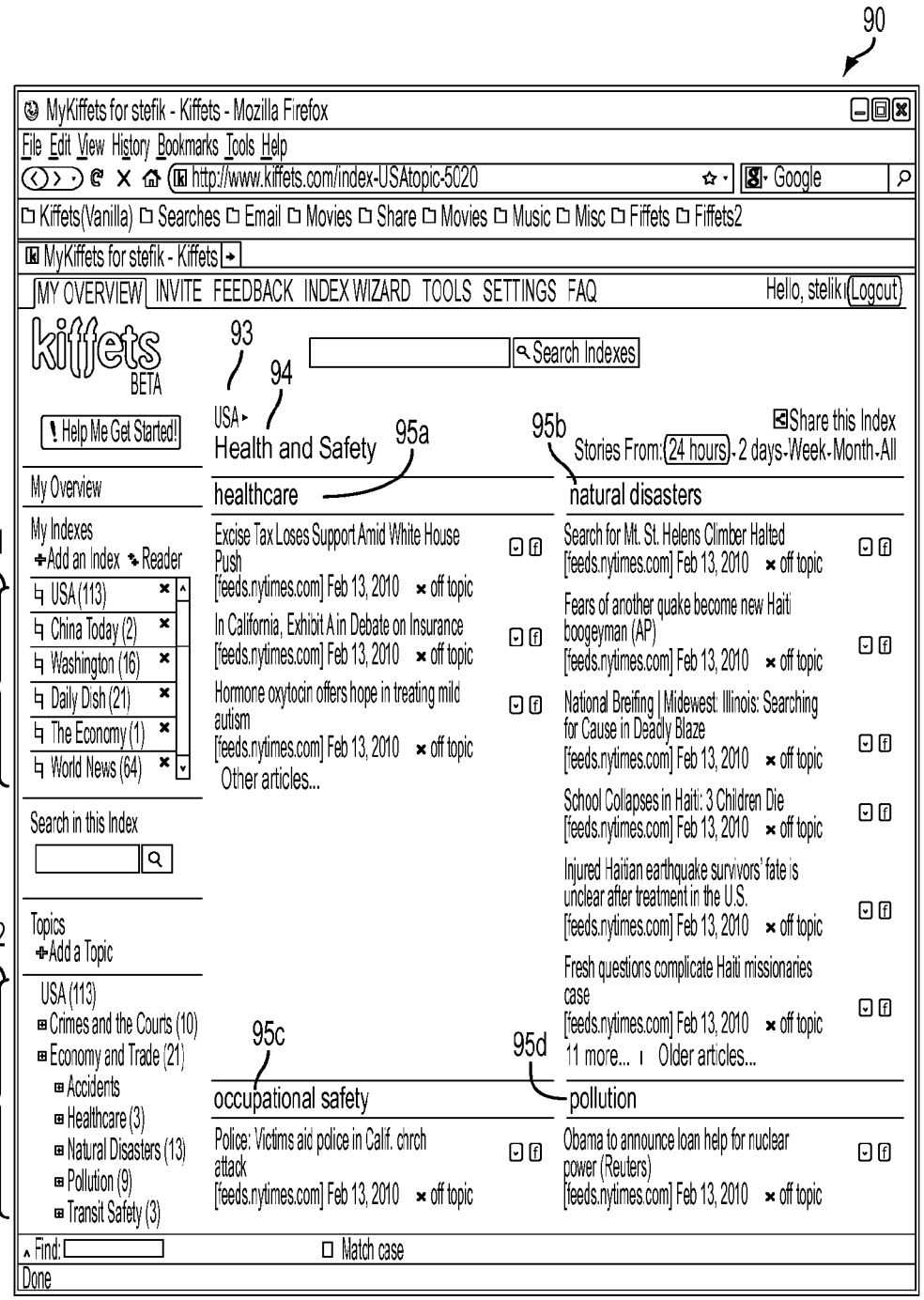
FIG. 8 is a diagram showing, by way of example, a screen shot of a topical index with topic entries having multiple levels.

In one sense, a multi-level topic model can be viewed as a hierarchy of recursively-defined subtopics. Each topic is defined by a discrete Boolean query and similarity measures. FIG. 8 is a diagram 90 showing, by way of example, a screen shot of a topical index 92 with topic entries having multiple levels. A set of topical indexes 91, or "channels," are provided for readers to use. The "USA" topical index includes a set of high-level topics 92, such as "Crime and the Courts," "Economy and Trade," "Health and Safety," and so forth. A reader can select the "USA" topical index 93 and one of the topics within the index, such as the "Health and Safety" topic 94. A partial listing of synopses of articles classified under the subtopics 95a-95d of the "Health and Safety" topic 94 is then presented. Suppose the reader decided to explore one of the subtopics 95a-95d. FIG. 9 is a diagram 100 showing, by way of example, a screen shot of subtopics hierarchically nested under one of the topical entries in the topical index of FIG. 8. Here, the reader has selected the "natural disasters" subtopic 101. Within that subtopic, several more sub-subtopics 102a-d are presented, which include "Earthquakes," "Fires," "Storms," and "Volcano Eruptions."

The reader can continue exploring deeper levels of subtopics listed under the "Health and Safety" topic until terminal nodes in the hierarchy are reached. Stepping back, each level in the multi-level "USA" index has multiple topics. If a reader focuses on the top-level of the "USA" index, the "Health and Safety" topic is one of several high-level topics. For each topic at each level of the index, articles from its subtopics are classified as being on-topic relative to both the immediate subtopic and to each of its parent topics.

Article Presentation Factors

Beyond classification, several other factors can come into play in terms of governing which articles are presented to the reader. For instance, although there may be an abundance of articles, there is limited physical screen space to display the articles. The selection process for articles to display can consider factors of timeliness and topic "hotness" in prioritizing the allocation of space to articles, such as described in commonly-assigned U.S. patent application, entitled "System And Method For Managing User Attention By Detecting Hot And Cold Topics In Social Indexes," Ser. No. 12/360,834, filed Apr. 30, 2009, pending, the disclosure of which is incorporated by reference. As well, the selection process can invoke "fairness" of coverage across subtopics when selecting articles at a parent node by balancing at each level in a topic tree for articles across subtopics. Other article presentation criteria may be applied.

"Similarity-Duplicates"

Social indexes may collect articles from many sources that are feeding content into the repository. In news media, for example, different sources sometimes carry exactly the same article, albeit with variations in title or layout. For important or "breaking" news, different sources may present articles covering the same common news event nearly simultaneously, although the wording of the articles is different. In both situations, readers sense redundancy in the reporting and consider the articles to be "duplicates," even though the articles are not, in the literal sense, exact copies of one another. To streamline article presentation and eliminate such redundancies, candidate articles for presentation that would be considered such "similarity-duplicates" can be grouped together articles and a representative article selected from the group to be displayed. In a further embodiment, a link to the group of "related articles" can be provided to enable readers to explore differences in the reporting on an event. Duplicate detection is carried out at each level of a topic tree since similar articles may potentially arise under different topics, even topics that are facially disparate and listed under seemingly unrelated paths in the topic tree.

Multi-Level Topic Classification

Figure 10:
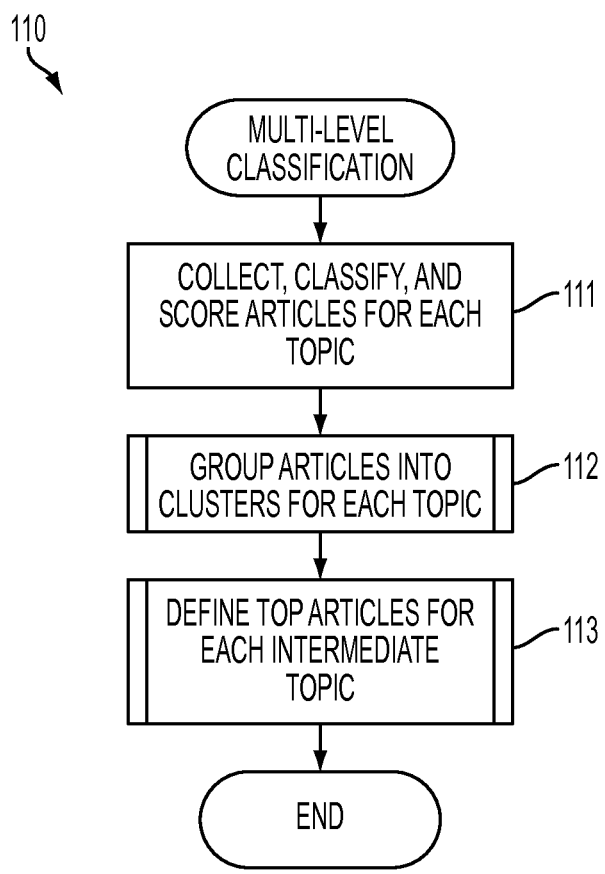
FIG. 10 is a flow diagram showing a method for performing operations during classification of multi-level topics in accordance with one embodiment.

The presentation of articles classified into multi-level topic models includes a rapid means for reducing duplication, including similarity duplication, of articles aggregated across sub-topics. FIG. 10 is a flow diagram showing a method 110 for performing operations during classification of multi-level topics in accordance with one embodiment. The classification operations are performed as a series of process or method steps executed by, for instance, a general purpose programmed computer, such as a server operating alone or in collaboration with other servers or devices as shown in FIG. 1.

The topics are organized in a hierarchy of topic levels. Each non-terminal topic level has its top articles identified. During multi-level topic classification, articles are collected, classified, and scored for each topic (step 111), such as described supra with respect to multi-core classification. Articles are identified and ordered for the topmost topic level of the topic hierarchy, while articles are recursively formed into clusters for the subsequent topic level of the topic hierarchy (step 112), as further described below with reference to FIG. 11. For each intermediate topic, a roll-up process for defining top-articles is performed (step 113), as further described below with reference to FIG. 12.

Following, the articles are presented to the reader, such as in the context of a topical index.

Article Clustering

Figure 11:
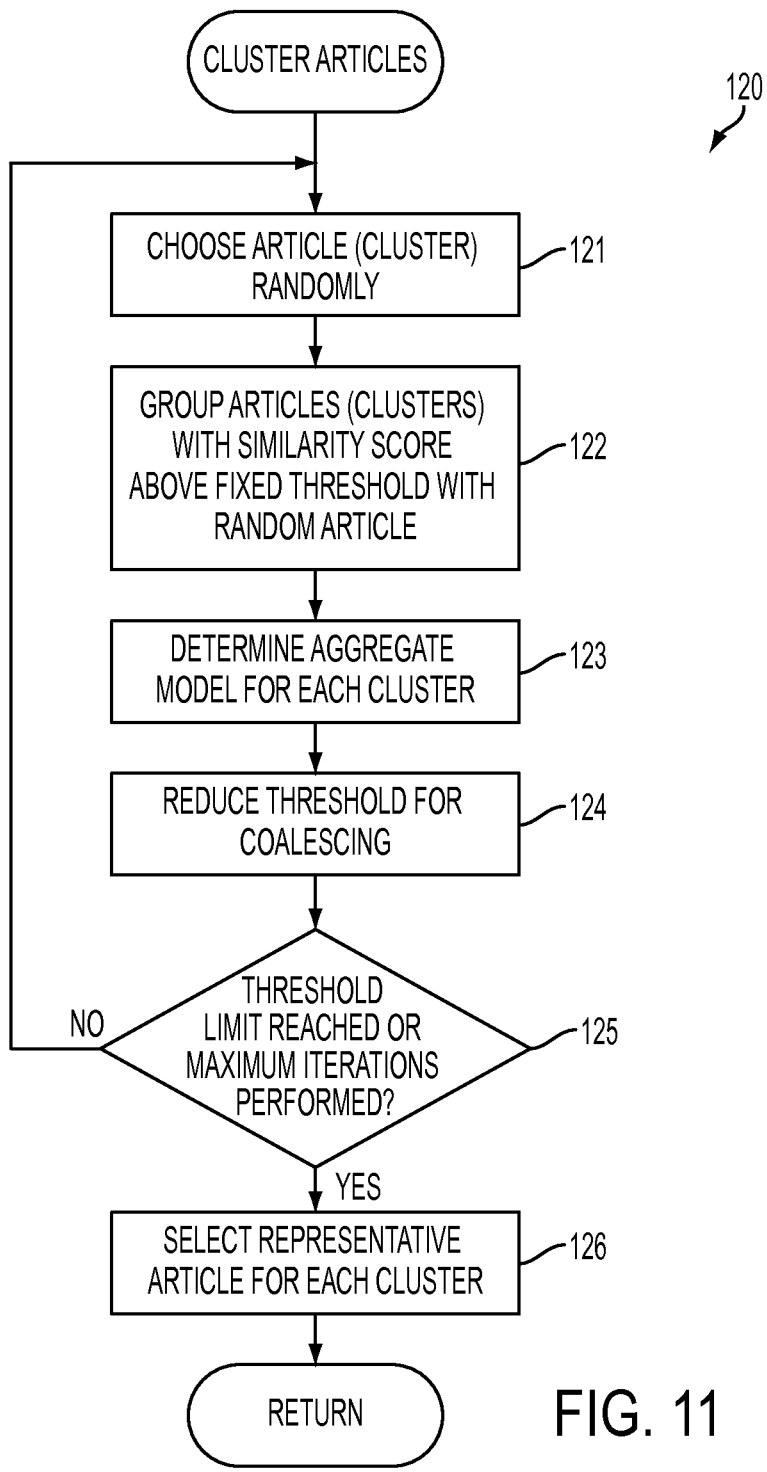
FIG. 11 is a flow diagram showing a routine for performing operations to cluster articles for use in the method of FIG. 10.

Articles are grouped into clusters by a multi-pass clustering algorithm, although other approaches for rapid clustering could equally be applied. FIG. 11 is a flow diagram showing a routine 120 for performing operations to cluster articles for use in the method of FIG. 10. The operations are first performed on articles, then recursively on clusters until a convergence condition is reached.

In the first pass, an article is chosen randomly as a cluster seed (step 121). Cluster membership is determined based on a sliding threshold for coalescing. A similarity score is determined for each remaining article and the cluster seed and those remaining articles having a similarity score above the threshold for coalescing relative to the randomly-chosen article is grouped with the randomly-chosen article and removed from further consideration (step 122). In one embodiment, the similarity score is generated using a cosine function. Equivalence or distance metrics other than the cosine can be also used in clustering, such as described in commonly-assigned U.S. patent application Ser. No. 12/608,929, Id. When all of the articles have been considered and placed into clusters, an aggregate model is computed for each of the clusters (step 124). The threshold for coalescing is reduced (step 124) and the process (step 121-124) is repeated over the set of clusters (step 125) until the threshold for coalescing reaches a pre-defined limit or the number of passes reaches a pre-defined lower bound, which finalizes the set of clusters. Finally, a representative article is selected for each cluster (step 126). The representative article is selected depending upon several criteria, including the candidate representative article's similarity to the aggregate model of the cluster, the article's length and publication date, and other factors.

Roll-Up

Figure 12:
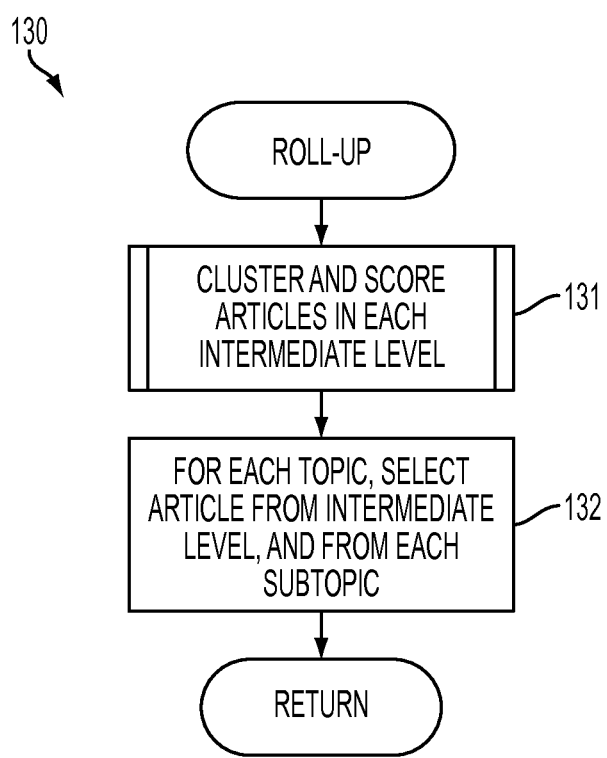
FIG. 12 is a flow diagram showing a routine for performing roll-up operations for use in the method of FIG. 10.

A roll-up process is performed for defining and highlighting top-articles at each intermediate level. Other approaches to aggregating articles from subtopics could alternatively be employed. FIG. 12 is a flow diagram showing a routine 130 for performing roll-up operations for use in the method of FIG. 10. First, the articles on each intermediate topic level are clustered and scored (step 131), as described supra with reference to FIG. 11. Then, for each topic, a greedy round robin article selection is carried out to select an article from the intermediate topic and from each subtopic (step 132), up to a maximum number of articles from each of its subtopics. Those articles having the highest scores are selected first from each subtopic. The top-articles are then returned to the classifier.

While the invention has been particularly shown and described as referenced to the embodiments thereof, those skilled in the art will understand that the foregoing and other changes in form and detail may be made therein without departing from the spirit and scope.

What is claimed is:

1. A computer-implemented system for providing multi-core topic indexing in electronically-stored social indexes, comprising:

a storage device comprising:
  a corpus of articles each comprised of online textual materials and a topics;
  a finite state pattern for each topic, each finite state pattern defining a fine-grained topic model that is used to identify the articles that are potentially on-topic; and
  on-topic training examples and off-topic training examples from the articles for each topic;
  one or more of distinct core meanings for the topic by assigning at least one of the on-topic training examples and the off-topic training examples;
  a set of average on-topic articles, comprising:
    a training module configured to provide a set of random training examples from the corpus;
    a match module configured to match the set of random training examples to the finite state pattern for the topic;
    an off-topic elimination module configured to eliminate an article that is similar to the off-topic training examples; and
    an on-topic addition module configured to add the on-topic training examples into the set of the random training examples; and
  an average on-topic core meaning based on the set of the average on-topic articles;

a social indexing system, comprising:
  a characteristic words selector configured to specify characteristic words for each of the on-topic training examples, the off-topic training examples, and the set of average on-topic articles, and to assign scores to the characteristic words that were specified for the on-topic training examples, off-topic training examples, and the set of average on-topic articles;
  a characteristic words organizer configured to specify on-topic characteristic word term vectors, each on-topic characteristic word term vector comprising the scores of the characteristic words that were specified for each topic for each of the on-topic training examples;
  a characteristic words scorer configured to specify off-topic characteristic word term vectors, each off-topic characteristic word term vector comprising the scores of the characteristic words that were specified for each topic for each of the off-topic training examples;
  a characteristic words specifier configured to specify average on-topic characteristic word term vectors, each average on-topic characteristic word term vector comprising the scores of the characteristic words that were specified for each topic for the set of average on-topic articles;
  an information collector configured to obtain a new article;
  a finite state pattern matcher configured to match the new article to the finite state pattern of each of the topics to designate the new article as a candidate article for each topic to which the finite state pattern was matched;
  a candidate article characteristic words selector configured to specify characteristic words extracted from the candidate article;
  a candidate article characteristic words scorer configured to assign candidate article scores to the characteristic words of the candidate article;
  a topic comparer configured to compare the candidate article scores to the off-topic characteristic word term vectors of each topic and to form an off-topic score for each topic, and to discard the candidate article as off-topic for each topic in which the off-topic score for that topic exceeds an off-topic threshold; and
  a similarity score comparer configured to compare the candidate article scores to the on-topic characteristic word term vectors and the average on-topic characteristic word term vectors of each topic and to form an on-topic score for each topic and configured to select only the candidate articles as candidate on-topic articles which the on-topic score for that topic exceeds an on-topic threshold; and a display configured to present the candidate on-topic articles.

2. A computer-implemented method for providing multi-core topic indexing in electronically-stored social indexes, comprising:

accessing a corpus of articles each comprised of online textual materials and a tree of topics;
providing a finite state pattern for each topic, each finite state pattern defining a fine-grained topic model that is used to identify the articles that are potentially on-topic;
providing on-topic training examples and off-topic training examples from the articles for each topic;
defining one or more of distinct core meanings for the topic by assigning at least one of the on-topic training examples and the off-topic training examples;
obtaining a set of an average on-topic articles, comprising:
  providing a set of random training examples from the corpus;
  matching the set of random training examples to the finite state pattern for the topic;
  eliminating an article in the set of random training examples that is similar to the off-topic training examples; and
  adding the on-topic training examples into the set of the random training examples;
defining an average on-topic core meaning based on the set of average on-topic articles;
specifying characteristic words for each of the on-topic training examples, off-topic training examples, and the set of average on-topic articles;

assigning scores to the characteristic words that were specified for the on-topic training examples, off-topic training examples, and the set of average on-topic articles;

specifying on-topic characteristic word term vectors, each on-topic characteristic word term vector comprising the scores of the characteristic words that were specified for each topic for each of the on-topic training examples;

specifying off-topic characteristic word term vectors, each off-topic characteristic word term vector comprising the scores of the characteristic words that were specified for each topic for each of the off-topic training examples;

specifying average on-topic characteristic word term vectors, each average on-topic characteristic word term vector comprising the scores of the characteristic words that were specified for each topic for the set of average on-topic articles;

obtaining a new article;

matching the new article to the finite state pattern of each of the topics and designating the new article as a candidate article for each topic to which the finite state pattern was matched;

specifying characteristic words extracted from the candidate article;

assigning candidate article scores to the characteristic words of the candidate article;

comparing the candidate article scores to the off-topic characteristic word term vectors of each topic and forming an off-topic score for each topic;

discarding the candidate article as off-topic for each topic in which the off-topic score for that topic exceeds an off-topic threshold;

comparing the candidate article scores to the on-topic characteristic word term vectors and the average on-topic characteristic word term vectors of each topic and forming an on-topic score for each topic and selecting only the candidate articles as candidate on-topic articles which the on-topic score for that topic exceeds an on-topic threshold; and presenting the candidate on-topic articles.

3. A computer-implemented method according to claim 2, further comprising at least one of:

automatically generating the finite state pattern based on the on-topic and the off-topic training examples;

generating the finite state pattern through evaluation of default patterns;

suggesting the finite state pattern to the user based on an evaluation of the articles in the topic; and designating the finite state pattern as a discrete Boolean query specified by a user.

4. A computer-implemented method according to claim 3, further comprising:

selecting the on-topic training examples from the corpus;

selecting the off-topic training examples from the corpus; and defining the finite state pattern to match a maximum number of the on-topic training examples and to not match a maximum number of the off-topic training examples.

5. A computer-implemented method according to claim 2, further comprising:

specifying a label for each of the topics, each label comprising one or more words;

identifying constraints inherent in the literal structure of the topic tree;

for each topic in the topic tree, creating a candidate topic model that comprises at least one term derived from the words in at least one of the labels;

evaluating the candidate topic models for the topic tree against the constraints; and identifying the candidate topic model, which best satisfy the constraints, as the finite state pattern for the topic.

6. A computer-implemented method according to claim 2, further comprising:

aggregating the scores of the on-topic characteristic word term vectors for each topic into a set of on-topic scores at a topic center;

finding topic center similarity scores by comparing the candidate article scores to the set of the on-topic scores at the topic center of each topic;

weighting one or more of the on-topic training examples and the off-topic training examples; and proportioning the topic center similarity scores based on the respective weightings of the on-topic training examples and the off-topic training examples.

7. A computer-implemented method according to claim 2, further comprising:

computing the topic center similarity score by applying a cosine function to weights assigned to the characteristic words identified in each of the candidate articles, the on-topic training examples, and the off-topic training examples.

8. A computer-implemented method according to claim 2, further comprising at least one of:

presenting the candidate articles without filtering through the plurality of the finite state patterns of the topics; and presenting only the candidate articles comprised of an aggregate score meeting a minimum threshold.

* * * * *